United States Patent [19]
Teshima et al.

[11] 3,893,900
[45] July 8, 1975

[54] APPARATUS FOR TREATING WASTEWATER USING AN ELECTROLYTIC CELL

[75] Inventors: Toru Teshima, Hadano; Toshiie Nagasao; Minoru Tanaka; Kazuo Ariga, all of Tokyo; Yoshiko Takamura, Kawasaki, all of Japan

[73] Assignees: Stanley Denki Kabushiki Kaisha, Tokyo; Kabushiki Kaisha Inoue Japax Kenkyusho, Kanagawa-ken, both of Japan

[22] Filed: May 21, 1973

[21] Appl. No.: 362,511

[30] Foreign Application Priority Data
May 24, 1972  Japan.............................. 47-51403
June 9, 1972  Japan.............................. 47-57389
June 30, 1972  Japan.............................. 47-76565

[52] U.S. Cl. ............... 204/268; 204/149; 204/269; 204/273
[51] Int. Cl.............................................. B01k 3/00
[58] Field of Search ........... 204/149, 254, 255, 268, 204/269, 261, 273

[56] References Cited
UNITED STATES PATENTS
| | | | |
|---|---|---|---|
| 966,025 | 8/1910 | Lautzenhiser et al. | 204/269 X |
| 1,312,756 | 8/1919 | Stover | 204/268 |
| 3,006,826 | 10/1961 | Roller | 204/149 X |
| 3,335,078 | 8/1967 | Mehl | 204/268 |
| 3,558,466 | 1/1971 | Lebrizzi et al. | 204/269 X |
| 3,761,383 | 9/1973 | Backhurst et al. | 204/268 |

*Primary Examiner*—T. Tung
*Assistant Examiner*—W. I. Solomon

[57] ABSTRACT

An apparatus for treating wastewater by the use of an electrolytic cell, a pair of main electrodes opposed in the electrolytic cell to each other, a power source connected to the main electrodes, and a plurality of auxiliary electrodes disposed between the main electrodes, in which the auxiliary electrodes are bar electrodes of conductive material arranged in parallel with the main electrodes at such spaces as to avoid short circuits thereamong and so as to form a plurality of rows and a plurality of columns, thereby effectively increasing the contact surface areas of the auxiliary electrodes and the wastewater to be treated. The conductive material of the bar electrodes is of carbon, graphite, an oxidized metal or at least one of alloys to remove at least one cyanide and other impurities from the wastewater. The bar electrodes are held by an open casing. A storage cell may be further provided at the bottom of the electrolytic cell by the use of partition having a number of holes to introduce the wastewater through the storage cell. A number of insulating bars are provided at spaces among the auxiliary bar electrodes for causing pulsating currents of the wastewater in the electrolytic cell.

2 Claims, 8 Drawing Figures

APPARATUS FOR TREATING WASTEWATER USING AN ELECTROLYTIC CELL

This invention relates to an apparatus for the treatment of industrial wastewater to remove therefrom impurities, for example, such as heavy metallic ions, cyanides, suspensions, mud, coloring matter, silica, organic ions and compounds.

A conventional apparatus for the electrolytic treatment of industrial wastewater has been proposed, in which a batch system electrolytic cell have therein two plate-type main electrodes set opposite to each other and a plurality of plate-type auxiliary electrodes disposed between the main electrodes, the two main electrodes being connected to a power source through the auxiliary electrodes and the wastewater to be treated in the manner of constituting a closed circuit.

In the conventional wastewater treatment procedure employing an apparatus of such a construction, when the wastewater contains, for example, heavy metallic ions, its electrolysis is performed by using a metallic plate such as of aluminum at the main electrodes and the auxiliary electrodes, thereby dissolving out aluminum hydroxide or the like to treat heavy metallic ions by precipitating and separating them. When the wastewater contains cyanide, carbon plates are used as the main electrodes and the auxiliary electrodes to conduct DC electrolysis and then the decomposition treatment of the oxidized anode. However, due to the difficulty of reducing the distances between the main electrodes and the auxiliary electrodes beyond certain limits because of the structural reasons of the apparatus itself, the voltage in the cell dissolving out a metal at a certain current concentration becomes by far greater than the theoretical metaldissolving voltage, which causes gas generation and voltage loss. Particularly in the case of decomposing a cyanide, when its reduction reaction is effected by electrolytic oxidation of the surface of electrode, the possibility of the cyanide to contact the surface of electrode becomes much reduced, as the result of which its decomposition efficiency deteriorates so much. In addition, since the surface areas of the main electrodes and the auxiliary electrodes are small in comparison with the quantity of the wastewater under treatment, the amount of the metal's dissolution-out becomes reduced in respect of the voltage in an electrolytic cell of a given size, and so is the decomposition rate of the cyanide.

An object of the present invention is to provide an apparatus for the treatment of industrial wastewater capable of eliminating such defects as mentioned above and having a high-efficiency in treatment.

Another object of the present invention is to provide a wastewater treatment apparatus which is simple in construction, and easy in operation but maintainable at low cost.

The principle, construction and operations of this invention will be understood from the following detailed description taken in conjunction with the accompanying drawings, in which.

Figure 5:
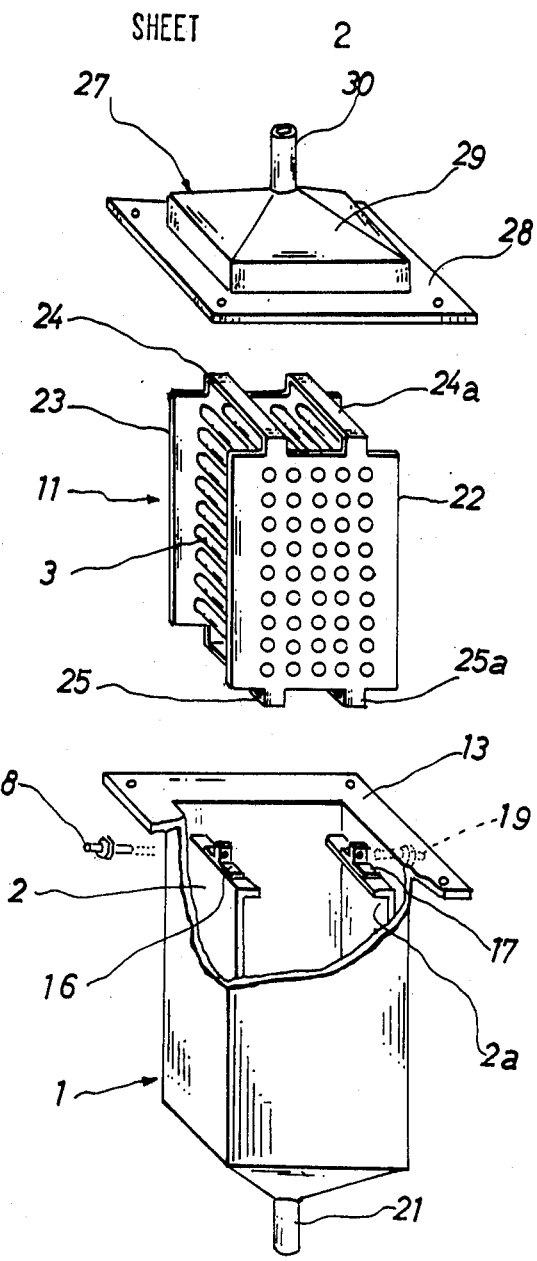
Figure 6:
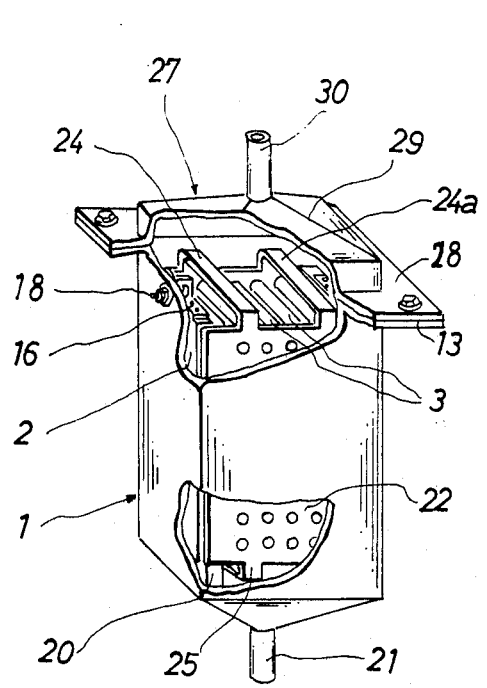
Figure 8:
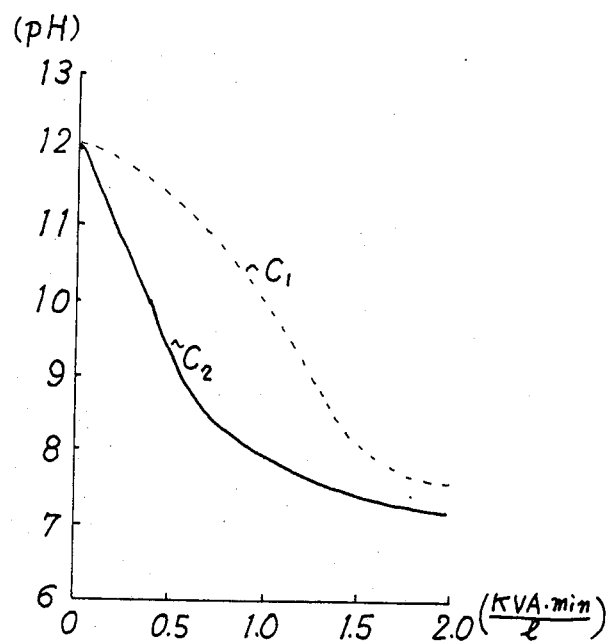
Figure 7:
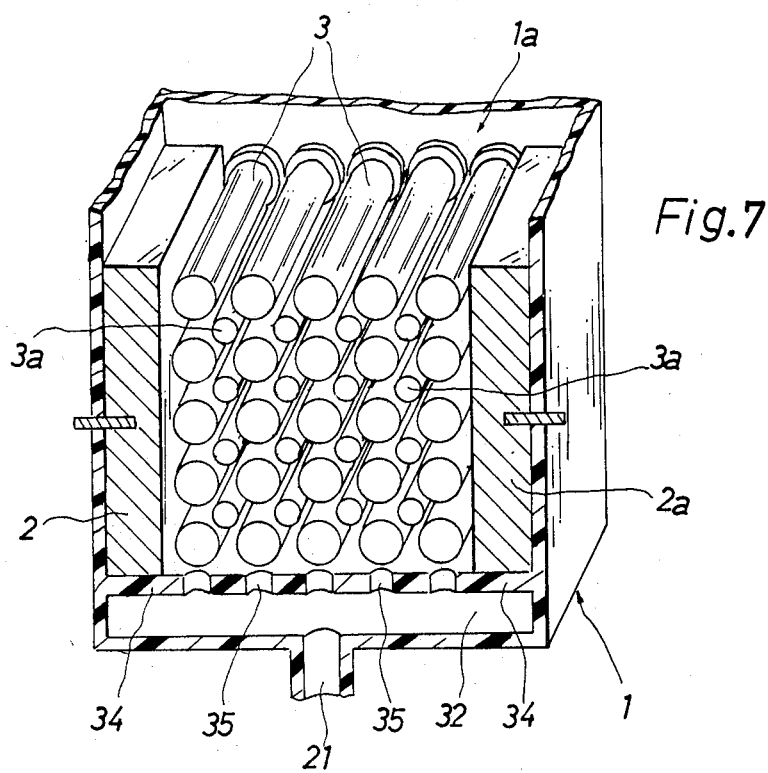

FIGS. 5 and 6 perspective views illustrating another embodiment of this invention;

FIG. 7 is a perspective view illustrating the inside construction of another ambodiment of this invention; and FIG. 8 is characteristic curves explanatory of actual test results in apparatus of this invention.

Figure 1:
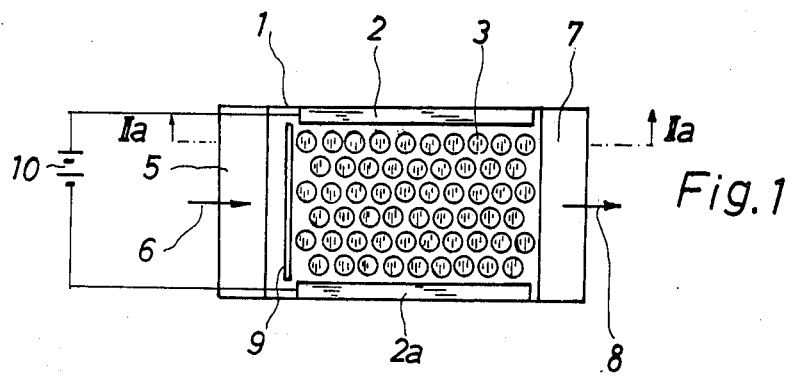
FIG. 1 is a plan view illustrating an embodiment of this invention.
Figure 2:
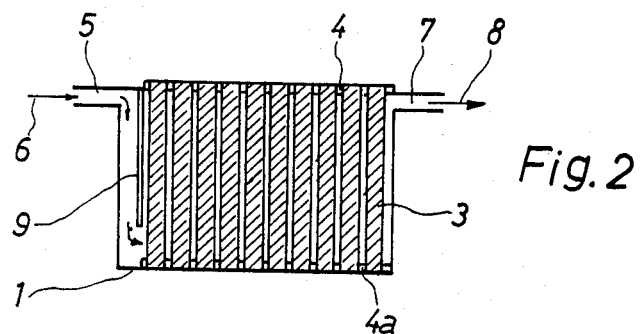
FIG. 2 is a sectional view along a line IIa—IIa in FIG. 1.

In FIG. 1, a reference numeral 1 indicates continuous electrolytic cell, having therein a pair of electrodes 2 and 2a disposed opposite to each other and installed in contact with the inside wall of the cell so as not to permit the flow of the wastewater behind them. In the electrolytic cell 1 are further provided with numerous conductive bartype auxiliary electrodes 3, the end portions of each of which are secured with fixing members 4 and 4a made of non-conductive material so as to be placed in parallel to the pair of electrodes 2 and 2a. The numerous auxiliary electrodes 3 are securely arranged between the electrodes 2 and 2a in closely adjacent but spaced relation to each other in a number of rows and columns. A group of these bar-type auxiliary electrodes 3 may be secured either vertically or horizontally, or in combination of both, and their fixation by means of the fixing members 4 and 4a, need not necessarily be made to the both-end portions of the bar-type auxiliary electrode 3. The fixing members 4 and 4a may be in the form of a plastic plate of porosity, or anything insulative such as plastic or rubber tubes that can securely hold the bartype auxiliary electrodes 3 at appropriate spaces. A reference numeral 5 represents an inlet 6 of the wastewater to be treated, installed in continuity to the electrolytic cell; 7 the outlet of the treated wastewater 8; 9 a partition controlling the flow route of the wastewater; 10 the power source, which, together with electrodes 2 and 2a, the group of bar-type auxiliary electrodes 3 and the treated wastewater, forms an electro chemical connection to produce an electric circuit.

In the present invention, two electrodes 2 and 2a are in use as illustrated. However, they can be increased in number if necessary. As for their shape, it need not necessarilly be defined to the flat plate type if the electrodes are installed appropriately in terms of electrochemistry. Moreover, as for the quality of the material of the electrodes, any material is unobjectionable so far as it ensures good conductivity; however, the most preferable material is graphite, stainless steel, aluminum, iron and the like.

The operations of the industrial wastewater treatment apparatus in accordance with the present invention will now be described below. Through the inlet 5, the wastewater-to-be-treated treated 6 is introduced into the electrolytic cell 1, where it passes continuously through the spaces defined by the group of the bar-type auxiliary electrodes 3, otherwise, in the case of batch system the wastewater 6 fills in the electrolytic cell 1. In such a state, if a DC voltage is applied across electrodes 2 and 2a, the respective faces of the bar-type auxiliary electrodes 3 and the wastewater interposing therebetween react with each other, so that the faces of the auxiliary electrodes 3 opposite to the positive electrode 2 become negative, while the faces opposite to the negative electrode 2a turns positive. On the faces of the positive electrode 2 and the auxiliary electrodes 3, there occurs an electrolytic oxidation reaction leading to the metallic dissolution-out, the cyanide decomposition, or other oxidation reaction. Meanwhile, on the negative faces of the negative electrode 2a and the auxiliary electrodes 3, there occurs electrolytic reduction reactions causing a metallic separation or other reduction reaction. Through such reactions, it is possible to decompose or remove the injurious matter contained in the impure water, such as the treated wastewater 6, and then to purify it.

The treating procedure abovementioned will be more specifically described in reference to our actual tests hereunder:

EXAMPLE 1

Figure 3:
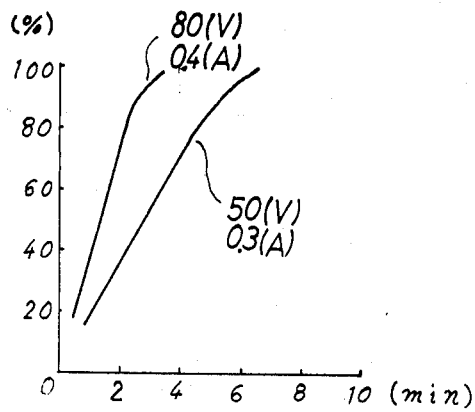
FIGS. 3 and 4 are characteristic curves explanatory of actual test results in apparatus of this invention.

In a plastic electrolytic cell measuring 10 cm (length) by 10 cm (width) by 20 cm (depth) were installed a pair of graphite plate electrodes on the inside walls of the cell, in opposition to each other at 7.5 cm apart. Between both electrodes were fixedly and closely placed Duralumin bars, each 5 centimeters in diameter and 15 centimeters in length, in parallel to both said electrodes. The electrolytic cell stuffed with those duralumin bars was filled with the wastewater-to-be-treated containing nickel ions of 100 ppm, and a DC voltage was applied across the electrodes. FIG. 3 shows the results obtained by the batch procedure; that is: by the aluminum hydroxide electrolyzed out from the duralumin it was made possible to treat nickel ions with a low current in a short period of time; and by the application of AC. voltage, substantially the same results were obtained. Furthermore, instead of duralumin for the auxiliary electrodes, the use of aluminum, or an alloy with aluminum as a principal component, or iron, magnesium or zinc, or alloys containing them respectively could achieve the same effects as above-mentioned. It was found also that the pair of the electrodes were effectively made of a metal identical with the material for the auxiliary electrodes. Since the hydroxides of the above-enumerated metallic materials all have an action of cohesion and co-precipitation, it was possible to remove, beside the previously mentioned nickel ions, heavy metallic ions, suspensoid material, mud, coloring matters, silica, and so on in a short period of time, and also to treat the reduction of chromic acid by acid of the dissolved-out iron etc. Incidentally, it is a matter of nature that a reduction in the distance between the electrodes can make the applied voltage so much lower, so that continuous electrolysis of the present invention can achieve the treatment of the wastewater with an extremely high efficiency.

EXAMPLE 2

Figure 4:
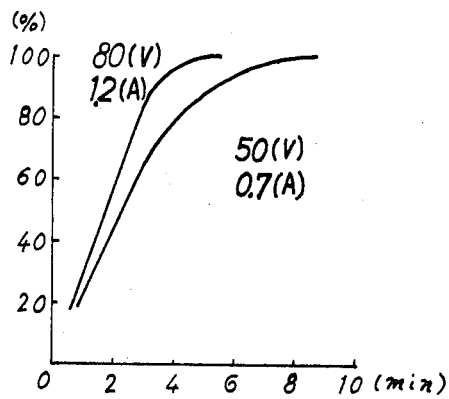

In the plastic electrolytic cell measuring 10 cm (length) by 10 cm (width) by 20 cm (depth), a pair of graphite plate electrodes was installed on the inside walls thereof in opposition to each other, the diatance between the electrodes being made 7.5 cm. As auxiliary electrodes, numerous graphite bars, each being of the size of 10 cm in diameter and 15 cm in length were so closely arranged as 2 mm apart between each other and fixed in parallel to the electrodes. Then, the electrolytic cell, which was constituted of the graphite bars arranged as explained above, was filled with the wastewater-to-be-treated, containing cyanic ions and cyanic complex ions of 100 ppm; and a DC voltage was applied across both electrodes, so that the results were obtained as illustrated in FIG. 4 through the batch procedure. As understood, only a short period of time was expended on the treatment of the cyanide through electrolytic oxidation and decomposition, and with a low current. In the continuous system employing the same conditions as the above, too, an extremely high efficiency treatment was achieved.

In case of cyanide solution containing impurities such as heavy metallic ions, suspensoid matter, mud, coloring matters, etc., the cyanide was treated through decomposition by employing graphite bars of the auxiliary electrodes 3 on the side of the inlet 5 of the electrolytic cell 1. In this portion, the cyanide was dissolved out, from which impurities were removed. In this case, both electrodes 2 and 2a may be of graphite plate; otherwise while employing a graphite plate for the positive electrode, stainless steel, or the metal of the same kind as of the bar-type auxiliary electrode 3 may be used for the negative electrode; or different kinds of metals may be used for the electrodes for the decomposition treatment of the cyanide and for the electrodes for the removal of impurities.

In the case of electrodes 2 and 2a and the bar-type auxiliary electrodes 3 being metallic as above-described, if a DC voltage is applied across electrodes 2 and 2a, the positive electrode, with the progress of time, has the attachment of a oxidized film thereon and the negative electrode the attachment of scale thereon. With such attachments on the electrodes, their electrolytic efficiency deteriorates. As a remedy for such a case, immersion of the electrodes in an acidic or alkaline solution cleans them of their attachments. Other remedies include blowing air, AC superimposition, reversion of polarities and AC electrolysis, which prevent a deterioration in electrolytic efficiency.

In general, the metal electrodes are exhausted by electrolysis but, in practice, because of the formation of resistance film due to the attachment of oxidized film or scale on the electrodes or the influence of non-uniform dissolution of the electrodes, about 30% of the overall electrodes do not perform their function and their efficiency deteriorates. This necessitates the replacement of the electrodes with new ones, which is uneconomical and increases the maintenance expenses and, further, assembling and disassembling operation of the auxiliary electrodes is troublesome and requires much labor and time.

An embodiment of this invention which eliminates the above defects will be described in connection with FIG. 5 and FIG. 6.

The wastewater treatment apparatus shown in FIG. 5 and FIG. 6 is roughly divided into an electrolytic cell 1 and an auxiliary electrode case 11 installed in the electrolytic cell 1 and is constructed to conduct continuous treatment.

The electrolytic cell 1 is substantially box-type one which is formed of an insulating material, for example, plastics or a metal insulated by coating an insulating material on its inside walls. An outwardly extending flange 13 is formed integrally with the upper opening edge of the electrolytic cell 1, a pair of plate-type electrodes 2 and 2a are installed on the opposing inside walls of the cell 1 while being insulated. These electrodes 2 and 2a are made of insoluble or relatively insoluble metal such, for example, as graphite, stainless steel or iron oxide or lead peroxide. Collector plates 16 and 17 are mounted on the top of each electrode 2 and 2a and connected to external terminals 18 and 19 and, at the same time, the external terminals 18 and 19 are led out from the electrolytic cell 1 and clamped, with packings and nuts in an insulating and watertight manner with the both collector plates 16 and 17 at predetermined position in the electrolytic cell 1. On the inside of the bottom of the electrolytic cell 1, there are attached a support 20 of the auxiliary electrode case 11 and a wastewater introducing pipe 21.

The auxiliary electrode case 11 comprises a pair of plastic support plates 22 and 23 formed of an insulating material, for example, plastics and disposed opposite to each other at an appropriate space therebetween, their upper and lower marginal edges are supported by support members 24, 24a, 25 and 25a to hold the support plates at the aforesaid space, and a number of bar-type auxiliary electrodes 3 are arranged in parallel between the two support plates 23 and 25 while being insulated from each other. The bar-type auxiliary electrodes 3 are those made of, for example, aluminum, magnesium, iron or like metal or an alloy composed principally of these metals or a mixture of them, and the bar-type auxiliary electrodes of different components are alternately arranged. Further, according to particular uses, the bar-type electrodes 3 may be formed of carbon, graphite, metal oxide, metal peroxide and the like. Reference numeral 27 designates a cover, which has a flat face 28 making contact with the flange 13 of the electrolytic cell 1 and a projecting portion 29, and a wastewater outlet pipe 30 is provided in the projecting portion 29 centrally thereof. This cover 27 may be dispensed with by changing the positions for the attachment of the wastewater inlet pipe 21 and the wastewater outlet pipe 30.

In the assembling of the wastewater treatment apparatus of this embodiment, the auxiliary electrode case 11 is inserted and installed in the electrolytic cell 1 and, in this case, the auxiliary electrode case 11 is positioned between the electrodes 2 and 2a previously installed in the electrolytic cell 1, in such a manner that the bar-type auxiliary electrodes 3 may be in parallel to the electrodes 2 and 2a and insulated therefrom, and the auxiliary electrode case 11 is supported with its bottom resting on the port 20. Then, the cover 27 is put on the electrolytic cell 1 and, in this case, the flange 13 and the flat face 28 snugly contact each other to make the interior of the electrolytic cell 1 in a watertight condition, and then they are suitably clamped together by bolts to seal the electrolytic cell.

The example is shown to be of the sealed type but the invention is not always be limited specifically thereto by changing the position for the attachment of the introducing and outlet pipes, that is, by attaching the outlet pipe near the upper marginal portion of the electrolytic cell.

The wastewater to be treated is introduced through the wastewater introducing pipe 21 into the electrolytic cell 1 of the above construction and, by applying a DC or AC current or DC-AC superimposed current across the electrodes 2 and 2a, the electrodes 2 and 2a and the bar-type auxiliary electrodes 3 are electrically interconnected through the wastewater under treatment, that is, an electrochemical reaction such as an anode oxidation reaction or conthode reduction reaction is caused to dissolve out the bar-type auxiliary electrodes 3 to form flocks of aluminum hydroxide or the like, thereby separating and removing heavy metallic ions, silica, iron, organic matter, supensions, mud, coloring matters and like impurities from the wastewater being treated. The treated wastewater is continuously drained out from the electrolytic cell 1 through the outlet 30 for the effluent of the wastewater. Further, by using graphite, carbon, iron oxide, lead peroxide or the like as the bar-type auxiliary electrodes, the wastewater containing a cyanide is treated by the electrolytic oxidizing decomposition to remove the latter from the former and then drained out through the wastewater outlet 30 as described above.

In the present invention, as described in the foregoing, since the electrolytic cell and the auxiliary electrode case are formed separately, the material of the auxiliary electrode case can be selected as desired according to the kind of the wastewater to be treated and assembling and disassembling of the auxiliary electrodes are easy. Further, the distances between the rod-type auxiliary electrodes are determined by attachment holes formed in the support plates and, by narrowing the distances, the electrochemical reaction speed and the amount of metal dissolved out can be increased to provide for greatly enhanced treatment efficiency.

With reference to FIG. 7, another embodiment of this invention capable of further reducing the power consumption will be described. In this embodiment, a storage cell 32 if further provided at the bottom of the electroytic cell 1 by the use of a partition 34 having a plurality of holes 35, and a number of insulating bars 3a are provided at spaces among the auxiliary bar electrodes 3 for causing pulsating currents of the wastewater. Other constructions are substantially the same as the embodiments mentioned above except partial differences.

The wastewater 6 to be treated is introduced from the inlet 21 and temporarily stored in the storage cell 32. The wastewater temporarily stored in the storage cell 32 then flows into the electrolytic cell 1, in which the wastewater causes pulsating currents by means of the auxiliary bar electrodes 3 and the insulating bars 3a. Accordingly, the wastewater is effectively electrolytically treated in accordance with refreshment phenomenon of the wastewater due to the pulsating currents at the periphery of each of the auxiliary bar electrodes 3.

In our actual test of the embodiment shown in FIG. 7 for wastewater containing cyanides, the following result was obtained. The sample of the wastewater in this test contains zinc-cyanide complex salt (cyanic concentration of 200 ppm) and additional compounds (pH: 12.1) separating hypochlorous acid ions after electrolytic dissociation, such as bleaching powder of high purity or sodium hypochlorite. The power consumption concentration necessary to reduce the hydrogen exponent of the sample to a value of pH 9 by electrolytic-treatment is a value of 0.55 KVA minutes/litre, while the remaining cyanic concentration is less than a value of one ppm as a result of our analysis. The above test result is shown by a curve $c2$ in FIG. 8 in comparison with a test result (a curve $c1$) by another embodiment of this invention. As understood from the characteristic curves shown in FIG. 8, the power consumption concentration necessary to reduce the hydrogen exponent of the wastewater to about a value of pH 9 becomes one-half so that the electrolytic treatment of the wastewater can be performed at a high efficiency and within a short period of time.

What we claim is:

1. Apparatus for treating wastewater comprising an electrolytic cell a pair of main electrodes opposed in the electrolytic cell to each other,
a power source connected to the main electrodes,
a plurality of auxiliary electrodes disposed between the main electrodes, the auxiliary electrodes being bar electrodes of conductive material arranged at such spaces as to avoid short circuits thereamong and so as to form a plurality of rows and a plurality of columns, thereby effectively increasing the contact surface areas of the auxiliary electrodes and the wastewater,
said electrolytic cell having a perforated partition spaced from the bottom of the cell and defining therewith a storage cell, said storage cell having a wastewater inlet whereby wastewater is introduced into the electrolytic cell through the storage cell and the perforations in the partition, and
a plurality of insulating bars disposed in the spaces, respectively, parallel with and repetitively staggered relative to said auxiliary electrodes and isolated therefrom whereby to cause pulsating currents of the wastewater in the electrolytic cell.

2. Apparatus for treating wastewater comprising an electrolytic cell
a pair of main electrodes opposed in the electrolytic cell to each other,
a power source connected to the main electrodes,
a plurality of auxiliary electrodes disposed between the main electrodes, the auxiliary electrodes being bar electrodes of conductive material arranged at such spaces as to avoid short circuits thereamong and so as to form a plurality of rows and a plurality of columns, thereby effectively increasing the contact surface areas of the auxiliary electrodes and the wastewater,
open casing means for holding said auxiliary bar electrodes in parallel with the main electrodes,
said electrolytic cell having a perforated partition spaced from the bottom of the cell and defining therewith a storage cell, said storage cell having a wastewater inlet whereby wastewater is introduced into the electrolytic cell through the storage cell and the perforations in the partition, and
a plurality of insulating bars disposed in the spaces, respectively, parallel with and repetitively staggered relative to said auxiliary electrodes and isolated therefrom whereby to cause pulsating currents of the wastewater in the electrolytic cell.

* * * * *